United States Patent
Gao et al.

(10) Patent No.: US 11,991,068 B2
(45) Date of Patent: May 21, 2024

(54) MULTICHASSIS LINK AGGREGATION METHOD AND DEVICE

(71) Applicant: HUAWEI TECHNOLOGIES CO., LTD., Shenzhen (CN)

(72) Inventors: Yuan Gao, Nanjing (CN); Wanmei Zeng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 30 days.

(21) Appl. No.: 17/863,965

(22) Filed: Jul. 13, 2022

(65) Prior Publication Data

US 2022/0353176 A1 Nov. 3, 2022

Related U.S. Application Data

(63) Continuation of application No. PCT/CN2020/119558, filed on Sep. 30, 2020.

(30) Foreign Application Priority Data

Jan. 16, 2020 (CN) .......................... 202010049052.3

(51) Int. Cl.
*G06F 15/16* (2006.01)
*H04L 45/00* (2022.01)
(Continued)

(52) U.S. Cl.
CPC ............ *H04L 45/245* (2013.01); *H04L 45/28* (2013.01); *H04L 45/66* (2013.01)

(58) Field of Classification Search
CPC ....... H04L 45/245; H04L 45/28; H04L 45/66; H04L 65/762; H04L 65/765; H04L 47/801; H04L 47/806
See application file for complete search history.

(56) References Cited

U.S. PATENT DOCUMENTS

2017/0063672 A1 3/2017 Chhabra et al.

FOREIGN PATENT DOCUMENTS

| CN | 103098424 A | 5/2013 |
| CN | 105493454 A | 4/2016 |

(Continued)

OTHER PUBLICATIONS

Martini, RFC7275, "Inter-Chassis Communication Protocol for Layer 2 Virtual Private Network (L2VPN) Provider Edge (PE) Redundancy", 2014 (Year: 2014).*

(Continued)

*Primary Examiner* — Oscar A Louie
*Assistant Examiner* — Messeret F Gebre
(74) *Attorney, Agent, or Firm* — HAUPTMAN HAM, LLP

(57) ABSTRACT

A multichassis link aggregation method includes receiving, by a first network device, n pieces of second information of n second network devices. The first network device and the n second network devices are in a multichassis link aggregation group (MC-LAG), n is an integer greater than or equal to 1, the n pieces of second information include n second port keys, and the n pieces of second information are in one-to-one correspondence with the n second port keys. The method also includes determining, by the first network device, a third port key based on a first port key of the first network device and the n second port keys. The third port key is an MC-LAG configuration parameter of the first network device.

20 Claims, 10 Drawing Sheets

(51) Int. Cl.
*H04L 45/24* (2022.01)
*H04L 45/28* (2022.01)

(56) References Cited

FOREIGN PATENT DOCUMENTS

| CN | 105743816 | A | | 7/2016 | | |
|---|---|---|---|---|---|---|
| CN | 106411731 | A | * | 2/2017 | ............ | H04L 12/46 |
| CN | 108923964 | A | | 11/2018 | | |
| CN | 109150579 | A | | 1/2019 | | |
| EP | 3367619 | A1 | * | 8/2018 | ............ | H04L 12/46 |
| WO | 2014018253 | A1 | | 1/2014 | | |

OTHER PUBLICATIONS

H. Birkholz and I. Sieverdingbeck, "Supporting Security Automation for Multi-chassis Link Aggregation Groups via the Interconnected-Asset Ontology," 2014 Ninth International Conference on Availability, Reliability and Security, Fribourg, Switzerland, 2014, pp. 126-133 (Year: 2014).*

Erro, G. (2011). The long-distance LAN [data centre interconnect links]. InformationWEEK, (1316), 31-2. Retrieved from https://dialog.proquest.com/professional/docview/928374094?accountid=131444 (Year: 2011).*

"Smart Link Aggregation(SLAG)", 2014 (Year: 2014).*

Luca Martini et al., Inter-Chassis Communication Protocol for L2VPN Pe Redundancy, draft-ietf-pwe3-iccp-03.txt, Internet Engineering Task Force, Jul. 12, 2010, 63 pages.

Patrice Brissette et al., EVPN multi-homing port-active load-balancing, draft-brissette-bess-evpn-mh-pa-01, Internet-Draft, Feb. 28, 2018, 10 pages.

Weiguo Hao et al., Handshaking mechanism for DF election draft-hao-bess-evpn-df-handshaking-02.txt, Internet Draft, May 12, 2015, 11 pages.

Patrice Brissette et al., EVPN multi-homing pert-active load-balancing, draft-brissette-bess-evpn-mh-pa-04, BESS Working Group, 10 pages.

Rick van''t Spijker, Multiple Systems Link Aggregation Control Protocol, Master of Science—Mobile and Distributed Computer Networks Leeds Metropolitan University Innovation North, May 31, 2010, 78 pages.

International Search Report issued in corresponding International Application No. PCT/CN2020/119558, dated Jan. 4, 2021, pp. 1-9.

Extended European Search Report issued in corresponding European Application No. 20913346.1, dated Dec. 9, 2022, pp. 1-14.

Chinese Office Action issued in corresponding Chinese Application No. 202010049052.3, dated Apr. 22, 2023, pp. 1-19.

* cited by examiner

```
 0 1 2 3 4 5 6 7 8 9 0 1 2 3 4 5 6 7 8 9 0 1 2 3 4 5 6 7 8 9 0 1
  Type=0xx     Sub-Type=0xx           local-port-key
```

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type=0xx    |  Sub-Type=0xx |         local-port-key        |
+-+-+-+-+-+-+-+-+-+-+-+-+-+-+-+-+-+-+-+-+-+-+-+-+-+-+-+-+-+-+-+-+
|          ce-port-key          |                               |
+-+-+-+-+-+-+-+-+-+-+-+-+-+-+-+-+-+-+-+-+-+-+-+-+-+-+-+-+-+-+-+-+
```

FIG. 11

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type=0xx    |  Sub-Type=0xx |         local-port-key        |
+-+-+-+-+-+-+-+-+-+-+-+-+-+-+-+-+-+-+-+-+-+-+-+-+-+-+-+-+-+-+-+-+
|          ce-port-key          |        lacp-sys-priority      |
+-+-+-+-+-+-+-+-+-+-+-+-+-+-+-+-+-+-+-+-+-+-+-+-+-+-+-+-+-+-+-+-+
```

FIG. 12

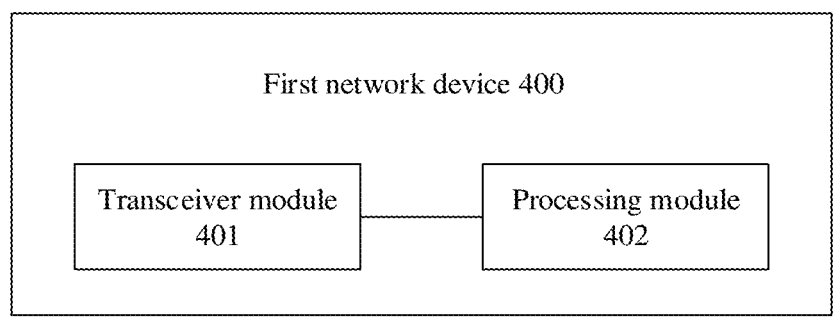

FIG. 13

MULTICHASSIS LINK AGGREGATION METHOD AND DEVICE

CROSS-REFERENCE TO RELATED APPLICATIONS

This application is a continuation of International Application No. PCT/CN2020/119558, filed on Sep. 30, 2020, which claims priority to Chinese Patent Application No. 202010049052.3, filed on Jan. 16, 2020. The disclosures of the aforementioned applications are hereby incorporated by reference in their entireties.

TECHNICAL FIELD

This application relates to the field of communications technologies, and in particular, to a multichassis link aggregation method and a device.

BACKGROUND

A multichassis link aggregation group (MC-LAG) is a mechanism for implementing multichassis link aggregation, to perform multichassis link aggregation on one device and two other devices, thereby improving link reliability from a board level to a device level, and constituting an active-active system.

A current MC-LAG deployment solution is shown in FIG. 1. An MC-LAG is deployed between a device 2 and a device 3, multichassis link aggregation is performed on the device 2 and the device 3, and traffic of a device 1 may be forwarded by using the device 2 and the device 3. During multichassis link aggregation, the device 2 and the device 3 may negotiate with the device 1 by using a link aggregation control protocol (LACP), and LACP negotiation packets of the device 2 and the device 3 carry MC-LAG configuration parameters. Because the device 2 and the device 3 are different devices, an inter-chassis control protocol (ICCP) needs to be used between the device 2 and the device 3 to ensure a negotiation process of multichassis link aggregation. However, the MC-LAG configuration parameters of the device 2 and the device 3 need to be manually configured. When a plurality of devices are used, an MC-LAG configuration parameter needs to be manually configured for each of the plurality of devices. As a result, configuration of multichassis link aggregation is complex.

SUMMARY

This application provides a multichassis link aggregation method and a device, to implement automatic coordination of MC-LAG configuration parameters, thereby simplifying configuration of multichassis link aggregation.

According to a first aspect, this application provides a multichassis link aggregation method. The method is applied to a first network device in a multichassis link aggregation group MC-LAG. The MC-LAG further includes n second network devices, where n is an integer greater than or equal to 1. The method includes: The first network device receives n pieces of second information of the n second network devices, where the n pieces of second information respectively include n second port keys, and the n pieces of second information are in one-to-one correspondence with the n second port keys. The first network device determines a third port key based on a first port key of the first network device and the n second port keys, where the third port key is an MC-LAG configuration parameter of the first network device.

In the foregoing method, the MC-LAG is deployed between the first network device and the n second network devices. During multichassis link aggregation, the first network device receives the n pieces of second information of the n second network devices, and then may determine the MC-LAG configuration parameter of the first network device. For another network device in the MC-LAG, an MC-LAG configuration parameter of the another network device may be determined in a similar manner, so as to implement automatic coordination of MC-LAG configuration parameters, thereby simplifying configuration of multichassis link aggregation.

With reference to the first aspect, in a possible implementation of the first aspect, the third port key is one of the first port key and the n second port keys.

With reference to the first aspect, in a possible implementation of the first aspect, that the first network device determines a third port key based on a first port key of the first network device and the n second port keys includes: The first network device sorts the first port key and the n second port keys, and determines that a port key in the $i^{th}$ position is the third port key, where i is a positive integer.

With reference to the first aspect, in a possible implementation of the first aspect, the n pieces of second information are n second Ethernet segment ES routes, and the n second port keys are respectively carried in extended attribute fields of the n second ES routes.

With reference to the first aspect, in a possible implementation of the first aspect, the first port key is carried in a first ES route, and that the first network device determines a third port key based on a first port key of the first network device and the n second port keys includes: The first network device performs designated forwarder DF election on the first network device and the n second network devices based on the first ES route and the n second ES routes, to determine a DF in the first network device and the n second network devices; and the first network device determines that a port key included in an ES route corresponding to the DF is the third port key.

With reference to the first aspect, in a possible implementation of the first aspect, the MC-LAG configuration parameter further includes a system identifier ID, and the method further includes: The first network device determines the system ID of the first network device based on an obtained first Ethernet segment identifier ESI of the first network device, where the first ESI is the same as n second ESIs included in the n second ES routes.

With reference to the first aspect, in a possible implementation of the first aspect, the MC-LAG configuration parameter further includes a third system identifier ID, the n second ES routes respectively include n second system IDs, the n second ES routes are in one-to-one correspondence with the n second system IDs, and the method further includes: The first network device sorts a first system ID of the first network device and the n second system IDs, and determines that a system ID in the $j^{th}$ position is the third system ID of the first network device, where j is a positive integer.

With reference to the first aspect, in a possible implementation of the first aspect, the MC-LAG configuration parameter further includes a third port identifier ID, the n second ES routes respectively include n second port IDs, the n second ES routes are in one-to-one correspondence with the n second port IDs, and the method further includes: The first network device sorts a first port ID of the first network device and the n second port IDs, to determine an ordinal value corresponding to the first port ID, where the first port ID is an original port ID of the first network device before sorting; and re-determines the third port ID of the first network device based on the ordinal value.

With reference to the first aspect, in a possible implementation of the first aspect, the MC-LAG configuration parameter further includes a third system priority system priority, the n second ES routes respectively include n second system priorities, the n second ES routes are in one-to-one correspondence with the n second system priorities, and the method further includes: The first network device sorts a first system priority of the first network device and the n second system priorities, and determines that a system ID in the $k^{th}$ position is the third system priority of the first network device, where k is a positive integer.

With reference to the first aspect, in a possible implementation of the first aspect, the first network device is a first provider edge PE device, the n second network devices are n second PE devices, the n second PE devices are respectively connected to customer edge CE devices, the n pieces of second information further respectively include n fourth port keys, the n pieces of second information are in one-to-one correspondence with the n fourth port keys, the n fourth port keys are port keys of the CE devices respectively connected to the n second PE devices, and the method further includes: The first PE device determines whether there is an inconsistency in a fifth port key and the n fourth port keys, where the fifth port key is a port key of a CE device connected to the first PE device; and the first PE device generates alarm information when there is an inconsistency.

With reference to the first aspect, in a possible implementation of the first aspect, the n pieces of second information are n ES routes, and the n fourth port keys are respectively carried in extended attribute fields of the n ES routes.

With reference to the first aspect, in a possible implementation of the first aspect, the method further includes: The first network device sends first information to the n second network devices, where the first information includes the first port key.

According to a second aspect, this application provides a first network device. The first network device is included in a multichassis link aggregation group MC-LAG. The MC-LAG further includes n second network devices, where n is an integer greater than or equal to 1. The first network device includes: a transceiver module, configured to receive n pieces of second information of the n second network devices, where the n pieces of second information respectively include n second port keys, and the n pieces of second information are in one-to-one correspondence with the n second port keys; and a processing module, configured to determine a third port key based on a first port key of the first network device and the n second port keys, where the third port key is an MC-LAG configuration parameter of the first network device.

In the foregoing device, the MC-LAG is deployed between the first network device and the n second network devices. During multichassis link aggregation, the first network device receives the n pieces of second information of the n second network devices, and then may determine the MC-LAG configuration parameter of the first network device. For another network device in the MC-LAG, an MC-LAG configuration parameter of the another network device may be determined in a similar manner, so as to implement automatic coordination of MC-LAG configuration parameters, thereby simplifying configuration of multichassis link aggregation.

With reference to the second aspect, in a possible implementation of the second aspect, the third port key is one of the first port key and the n second port keys.

With reference to the second aspect, in a possible implementation of the second aspect, the processing module is configured to: sort the first port key and the n second port keys, and determine that a port key in the $i^{th}$ position is the third port key, where i is a positive integer.

With reference to the second aspect, in a possible implementation of the second aspect, the n pieces of second information are n second Ethernet segment ES routes, and the n second port keys are respectively carried in extended attribute fields of the n second ES routes.

With reference to the second aspect, in a possible implementation of the second aspect, the first port key is carried in a first ES route, and the processing module is configured to: perform designated forwarder DF election on the first network device and the n second network devices based on the first ES route and the n second ES routes, to determine a DF in the first network device and the n second network devices; and determine that a port key included in an ES route corresponding to the DF is the third port key.

With reference to the second aspect, in a possible implementation of the second aspect, the MC-LAG configuration parameter further includes a system identifier (ID), and the processing module is further configured to: determine the system ID of the first network device based on an obtained first Ethernet segment identifier ESI of the first network device, where the first ESI is the same as n second ESIs included in the n second ES routes.

With reference to the second aspect, in a possible implementation of the second aspect, the MC-LAG configuration parameter further includes a third system ID, the n second ES routes respectively include n second system IDs, the n second ES routes are in one-to-one correspondence with the n second system IDs, and the processing module is further configured to: sort a first system ID of the first network device and the n second system IDs, and determine that a system ID in the $j^{th}$ position is the third system ID of the first network device, where j is a positive integer.

With reference to the second aspect, in a possible implementation of the second aspect, the MC-LAG configuration parameter further includes a third port identifier ID, the n second ES routes respectively include n second port IDs, the n second ES routes are in one-to-one correspondence with the n second port IDs, and the processing module is further configured to: sort a first port ID of the first network device and the n second port IDs, to determine an ordinal value corresponding to the first port ID, where the first port ID is an original port ID of the first network device before sorting; and re-determine the third port ID of the first network device based on the ordinal value.

With reference to the second aspect, in a possible implementation of the second aspect, the MC-LAG configuration parameter further includes a third system priority system priority, the n second ES routes respectively include n second system priorities, the n second ES routes are in one-to-one correspondence with the n second system priorities, and the processing module is further configured to: sort a first system priority of the first network device and the n second system priorities, and determine that a system ID in the $k^{th}$ position is the third system priority of the first network device, where k is a positive integer.

With reference to the second aspect, in a possible implementation of the second aspect, the first network device is a first provider edge PE device, the n second network devices are n second PE devices, the n second PE devices are respectively connected to customer edge CE devices, the n pieces of second information further respectively include n fourth port keys, the n pieces of second information are in one-to-one correspondence with the n fourth port keys, the n fourth port keys are port keys of the CE devices respectively connected to the n second PE devices, and the processing module is further configured to: determine whether there is an inconsistency in a fifth port key and the n fourth port keys, where the fifth port key is a port key of a CE device connected to the first PE device; and generate alarm information when there is an inconsistency.

With reference to the second aspect, in a possible implementation of the second aspect, the n pieces of second information are n ES routes, and the n fourth port keys are respectively carried in extended attribute fields of the n ES routes.

With reference to the second aspect, in a possible implementation of the second aspect, the transceiver module is further configured to: send first information to the n second network devices, where the first information includes the first port key.

According to a third aspect, this application provides a first network device. The first network device includes a processor and a memory. The memory is configured to store program code. The processor is configured to invoke the program code in the memory to perform the method according to any one of the first aspect or the possible implementations of the first aspect.

According to a fourth aspect, this application provides a first network device. The first network device includes a processor. The processor is coupled to a memory. The processor is configured to invoke program code in the memory to perform the method according to any one of the first aspect or the possible implementations of the first aspect.

According to a fifth aspect, this application provides a readable storage medium. The readable storage medium stores instructions. When the instructions are run on a first network device, the first network device is enabled to perform the method according to any one of the first aspect or the possible implementations of the first aspect.

According to a sixth aspect, this application provides a computer program product. When the computer program product is run on a first network device, the first network device is enabled to perform the method according to any one of the first aspect or the possible implementations of the first aspect.

BRIEF DESCRIPTION OF DRAWINGS

FIG. 11 is a schematic diagram of another extended attribute field according to an embodiment of this application;

FIG. 12 is a schematic diagram of another extended attribute field according to an embodiment of this application;

FIG. 13 is a schematic diagram of a first network device according to an embodiment of this application.

DESCRIPTION OF EMBODIMENTS

The following describes the technical solutions in embodiments of this application with reference to accompanying drawings in embodiments of this application.

For ease of understanding this application, concepts used in this application are first explained.

Link aggregation control protocol: A link aggregation control protocol (LACP) is a protocol that is based on the IEEE802.3ad standard and that is for implementing dynamic link aggregation and disaggregation, so that a device automatically forms an aggregated link based on a configuration of the device and starts the aggregated link to receive and send data. An LACP mode is a link aggregation mode using the LACP. After an LACP protocol of a port is enabled, the port exchanges information with a peer end by using a link aggregation control protocol data unit (LACPDU), so that the two parties can agree on whether the port joins or exits a dynamic aggregation group.

Figure 1:
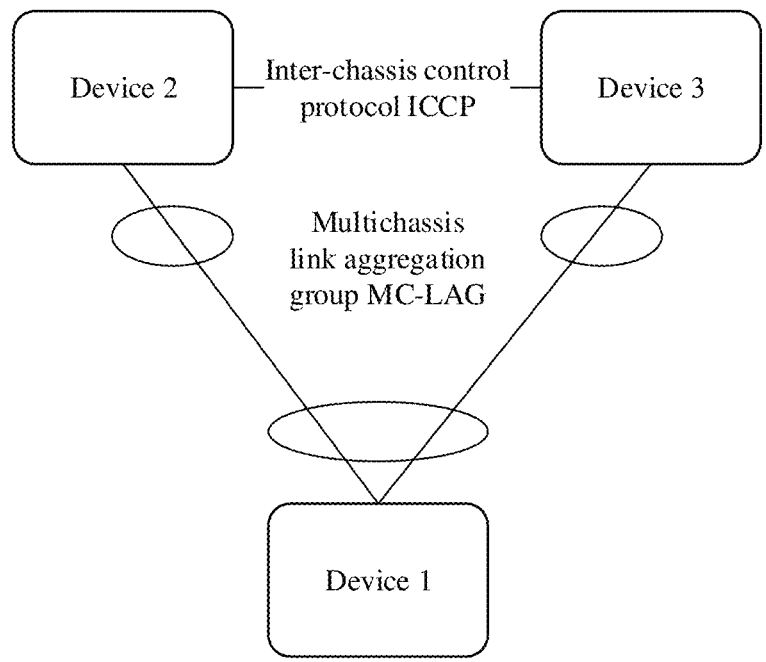
FIG. 1 is a schematic diagram of an MC-LAG deployment solution.
Figure 2:
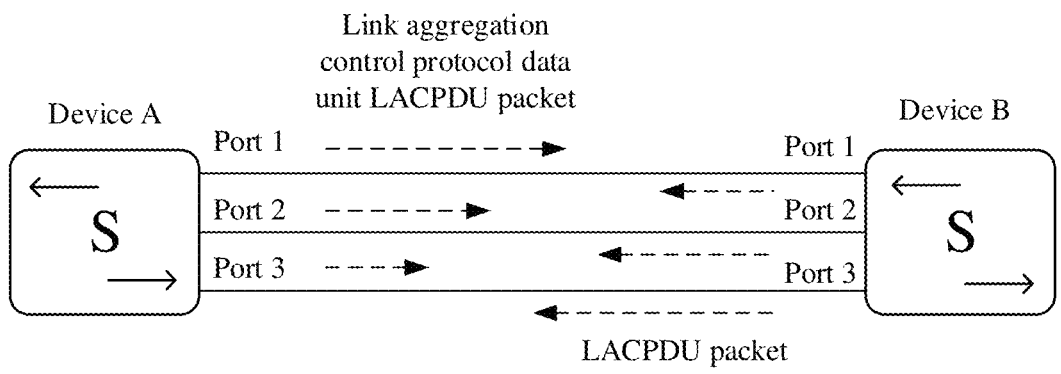
FIG. 2 is a schematic diagram of sending messages to each other in LACP-mode link aggregation.

FIG. 2 is a schematic diagram of sending messages to each other in LACP-mode link aggregation. As shown in FIG. 2, link aggregation ports are created on a device A and a device B and are configured to be in an LACP mode, and then, member ports are added to the link aggregation ports. Member ports in link aggregation ports of the device A include a port 1, a port 2, and a port 3, and member ports in link aggregation ports of the device B include a port 1, a port 2, and a port 3. In this case, an LACP protocol is enabled on the member ports of both the device A and the device B, and the two ends send LACPDU packets to each other, so that the device A and the device B can agree on whether the member port joins or exits a dynamic aggregation group.

Figure 3A:
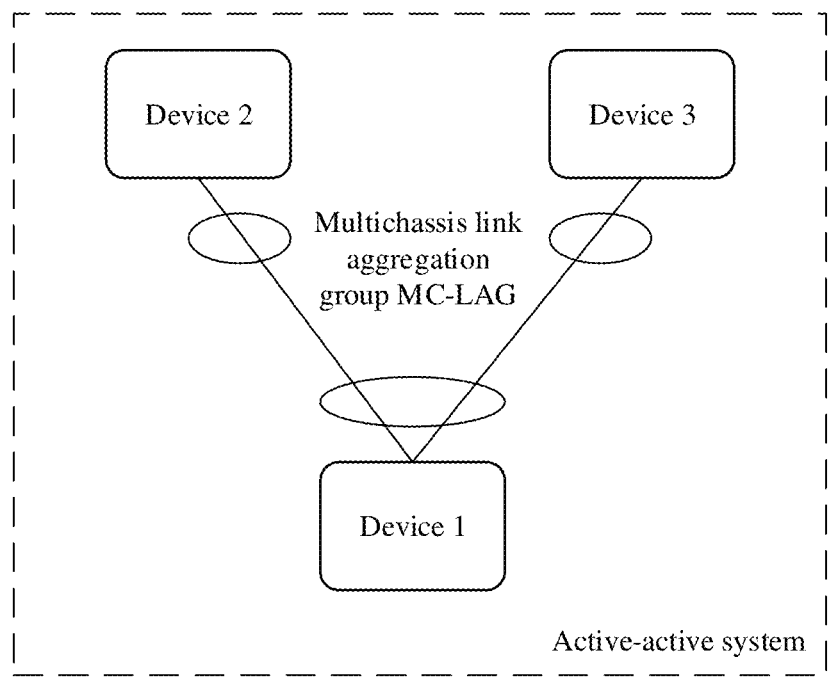
FIG. 3a is a schematic diagram of implementing an active-active system by using an MC-LAG.
Figure 3B:
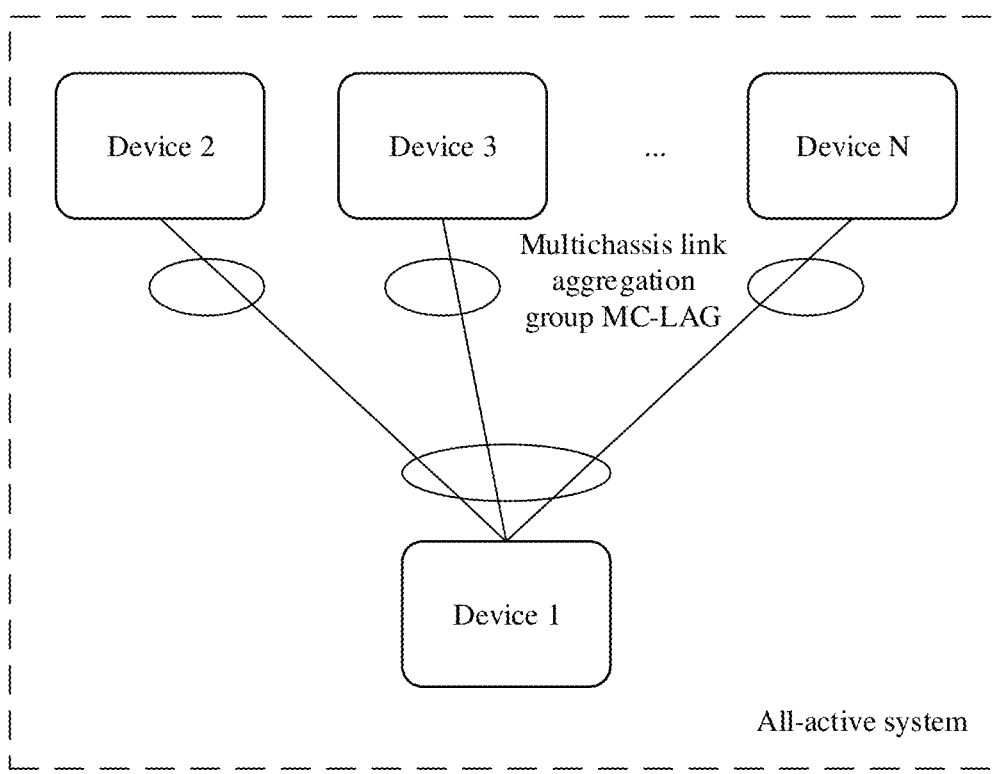
FIG. 3b is a schematic diagram of implementing an all-active system by using an MC-LAG.

Multichassis link aggregation group: A multichassis link aggregation group (MC-LAG) is a mechanism for implementing multichassis link aggregation, to perform multichassis link aggregation on one device and two other devices, thereby improving link reliability from a board level to a device level, and constituting an active-active system. FIG. 3a is a schematic diagram of implementing an active-active system by using an MC-LAG. The MC-LAG is established between a device 2 and a device 3, and traffic of a device 1 may be forwarded by using the device 2 and the device 3. In addition to establishing an MC-LAG between two devices, an MC-LAG may be alternatively established between a plurality of devices, that is, multichassis link aggregation is performed on one device and a plurality of other devices to constitute an all-active system. FIG. 3*b* is a schematic diagram of implementing an all-active system by using an MC-LAG. The MC-LAG is established between a device 2, a device 3, a device N, and the like, and traffic of a device 1 may be forwarded by using the device 2, the device 3, the device N, and the like.

Figure 4:
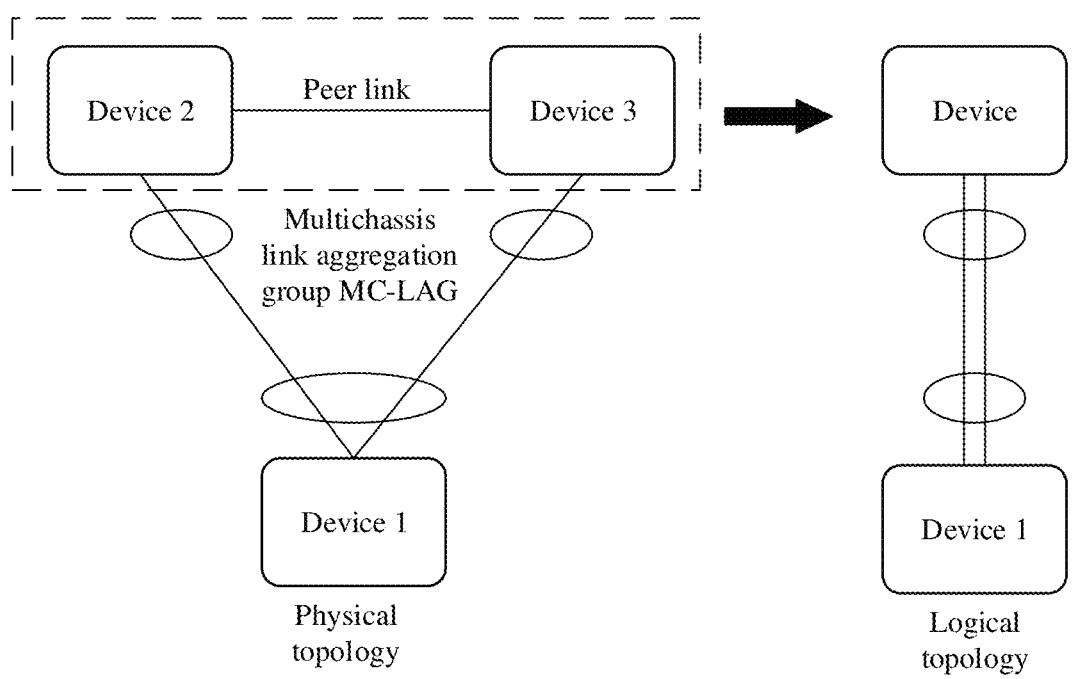
FIG. 4 is a schematic diagram of a topology of an MC-LAG.

FIG. 4 is a schematic diagram of a topology of an MC-LAG. As shown in FIG. 4, from the perspective of a physical topology, the MC-LAG is established between a device 2 and a device 3, and multichassis link aggregation is performed on a device 1 and the devices 2 and 3 to constitute an active-active system. A peer link is established between the device 2 and the device 3. The peer-link is used for exchange of negotiation packets and transmission of transverse service traffic between devices. Traffic of the device 1 may be forwarded by using the device 2 and the device 3, and a fault of either of the device 2 and the device 3 does not affect traffic forwarding. This ensures that a normal service is not interrupted. From the perspective of a logical topology, the device 2 and the device 3 that are accessed in a dual-homed manner are logically virtualized into one device. The MC-LAG can not only provide a layer-2 topology without a loop but also implement redundancy backup, so that complex spanning tree protocol configuration is no longer needed. This greatly simplifies networking and configuration. The device 2 and the device 3 may be separately upgraded, and as long as it is ensured that one device works normally, an ongoing service is almost unaffected.

Ethernet virtual private network: An Ethernet virtual private network (EVPN) is a virtual private network (VPN) technology used for layer-2 network interconnection. The EVPN technology extends a border gateway protocol (BGP), and uses extended reachability information, so that a media access control (MAC) address learning and advertisement process between layer-2 networks at different sites is transferred from a data plane to a control plane.

Figure 5:
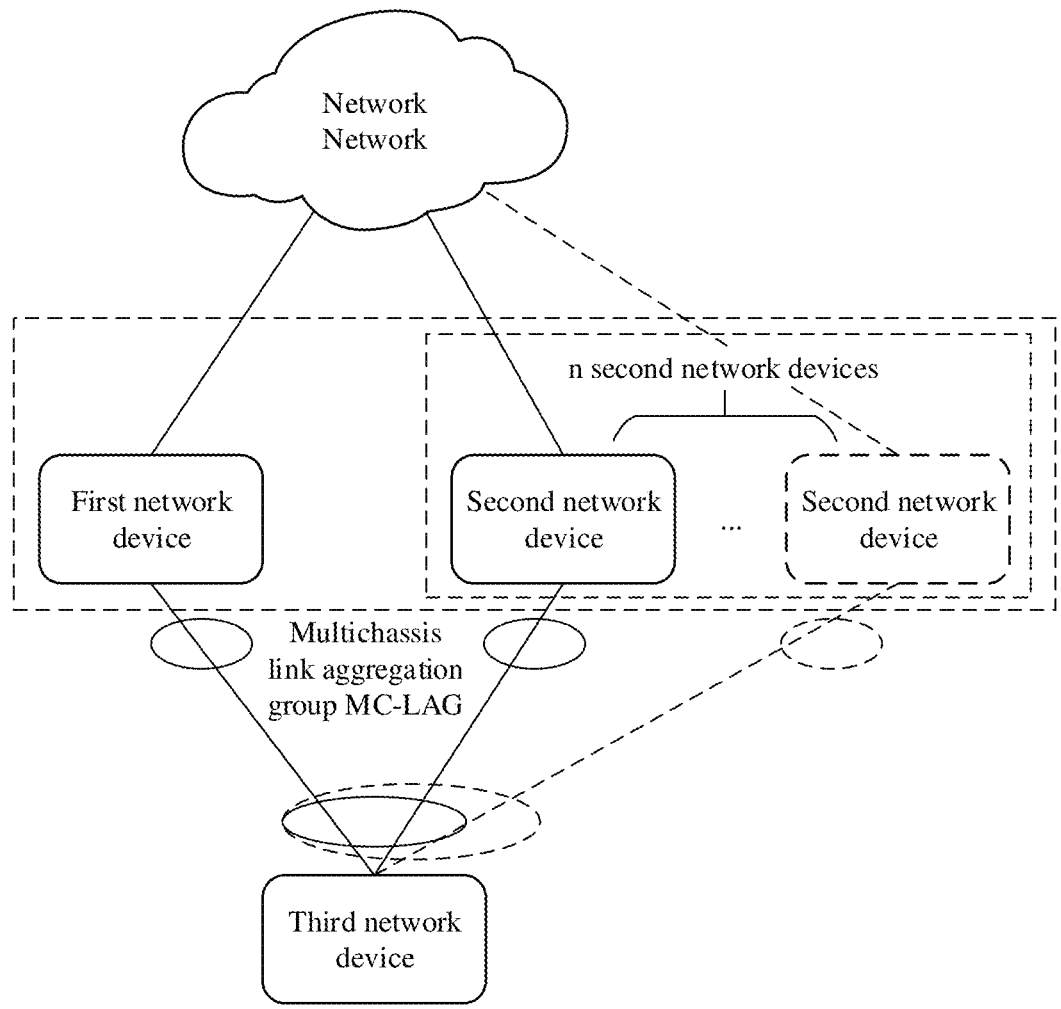
FIG. 5 is a schematic diagram of a network system according to an embodiment of this application.

FIG. 5 is a schematic diagram of a network system according to an embodiment of this application. As shown in FIG. 5, an MC-LAG is established between a first network device and n second network devices, so that the first network device and the n second network devices constitute the MC-LAG group. The MC-LAG group can support multi-homed access of a third network device. The first network device and the n second network devices are connected to a network, and are used for traffic forwarding. In this case, in some possible application scenarios, the first network device and the n second network devices may form load sharing, and jointly forward traffic; or in some other possible application scenarios, one network device serves as a primary device for traffic forwarding, and when the network device is faulty, traffic may be quickly switched to another network device for forwarding, thereby ensuring normal running of a service.

Herein, n is an integer greater than or equal to 1. When n is equal to 1, the MC-LAG is established between the first network device and the second network device, to implement dual-homed access of the third network device, so that traffic is forwarded by the two network devices jointly. When n is greater than 1, for example, n is equal to 3, the MC-LAG is established between the first network device and the three second network devices, to implement multi-homed access of the third network device, so that traffic is forwarded by the four network devices jointly. A quantity of second network devices is not limited to 1 or 3, and may be another integer greater than or equal to 1. This is not specifically limited herein.

The first network device and the second network device may be, for example, network-side devices, such as servers, switches, or routers. The third network device may be, for example, a user-side device, such as a network device that establishes a connection between a user terminal device and a network-side device. The network may be an EVPN, a virtual extensible local area network (VXLAN), an Internet protocol (IP) network, or the like.

Figure 6:
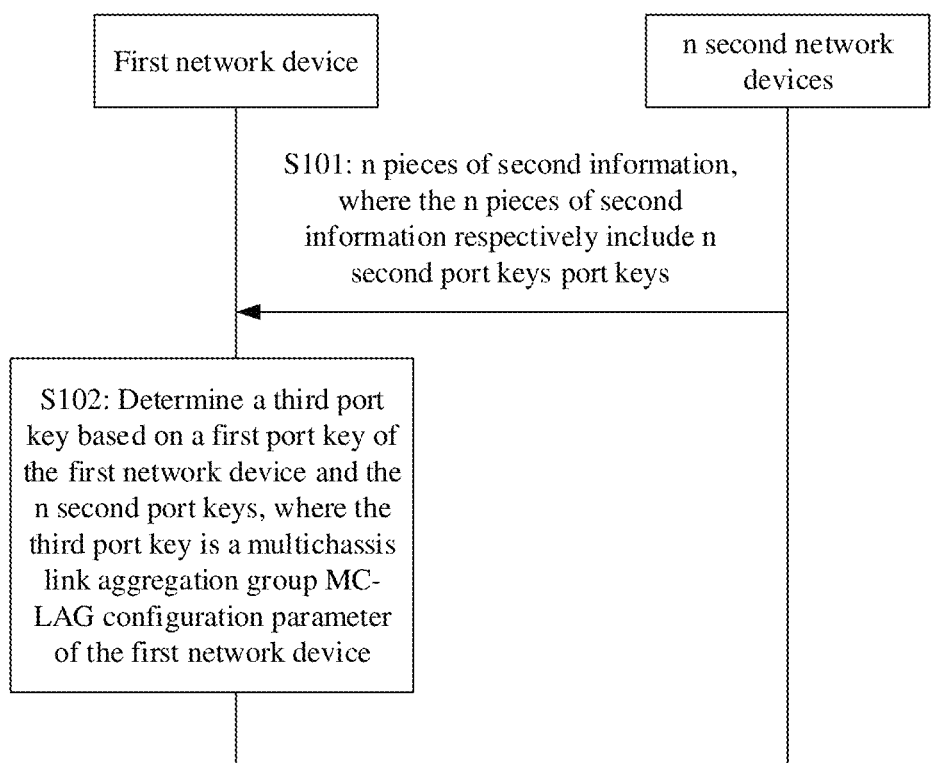
FIG. 6 is a schematic diagram of a multichassis link aggregation method according to an embodiment of this application.

FIG. 6 is a schematic diagram of a multichassis link aggregation method according to an embodiment of this application. The network system shown in FIG. 5 is used as an example. As shown in FIG. 6, the multichassis link aggregation method performed in the network system includes the following steps.

S101: A first network device receives n pieces of second information of n second network devices, where the n pieces of second information respectively include n second port keys, and the n pieces of second information are in one-to-one correspondence with the n second port keys.

The n pieces of second information are respectively from the n second network devices. Each of the n pieces of second information includes one second port key.

In a possible implementation, the first network device and the n second network devices are connected to an EVPN, and the n pieces of second information are n second Ethernet segment ES routes. The EVPN defines new network layer reachability information (NLRI), namely, EVPN NLRI, on a basis of a BGP, and defines an EVPN route type in the EVPN NLRI. An ES route is a type of EVPN route. An ES route is used to implement automatic discovery between network devices connected to a same device.

S102: The first network device determines a third port key based on a first port key of the first network device and the n second port keys, where the third port key is an MC-LAG configuration parameter of the first network device.

After receiving the n pieces of second information, the first network device determines the third port key based on the first port key and the n second port keys. The third port key is the MC-LAG configuration parameter of the first network device. The MC-LAG configuration parameter of the first network device is used as a configuration parameter obtained through negotiation and interworking between the first network device and another network device in an MC-LAG group, so as to implement link aggregation.

Optionally, the third port key is one of the first port key and the n second port keys.

In a possible implementation, the first network device sorts the first port key and the n second port keys, and determines that a port key in the $i^{th}$ position is the third port key, where i is a positive integer. For example, i may be 1, and the first network device determines that a port key whose ordinal value is the smallest is the third port key. Alternatively, i may be (n+1), and the first network device determines that a port key whose ordinal value is the largest is the third port key. Alternatively, i may be another positive integer between 1 and (n+1), and the first network device determines that a port key with a fixed ordinal value is the third port key.

Optionally, the third port key is determined based on the first port key and the n second port keys, and is not one of the first port key and the n second port keys.

In a possible implementation, the first network device sorts the first port key and the n second port keys, selects a port key in the $i^{th}$ position, where i is a positive integer, and then performs further calculation on the port key in the $i^{th}$ position according to a preset algorithm, to obtain the third port key. Likewise, i may be 1 or (n+1), or may be another positive integer between 1 and (n+1). This is not limited herein.

The MC-LAG is established between the first network device and the n second network devices, to implement multi-homed access of a device. During multichassis link aggregation, each of the first network device and the n second network devices may separately negotiate with another network device in the MC-LAG group by using an LACP protocol. An LACP negotiation packet of the first network device carries the third port key of the first network device, and LACP negotiation packets of the n second network devices respectively carry port keys of the n second network devices. To implement multichassis link aggregation, the third port key of the first network device is the same as the port keys of the n second network devices. It may be understood that any one of the n second network devices may determine a port key of the second network device by using the foregoing method. In other words, the first network device and the n second network devices may determine the same port keys by using the foregoing method, thereby implementing multichassis link aggregation, and improving flexibility of MC-LAG parameter configuration. It should be noted that, alternatively, the port key may not be carried in the LACP packet of the network device, but be carried in another type of packet, to be sent to another network device that constitutes the MC-LAG group with the network device.

In the foregoing method, the MC-LAG is deployed between the first network device and the n second network devices. During multichassis link aggregation, the first network device receives the n pieces of second information of the n second network devices, and then may determine the MC-LAG configuration parameter of the first network device. For another network device in the MC-LAG, an MC-LAG configuration parameter of the another network device may be determined in a similar manner, so as to implement automatic coordination of MC-LAG configuration parameters, thereby simplifying configuration of multichassis link aggregation.

Figure 7:
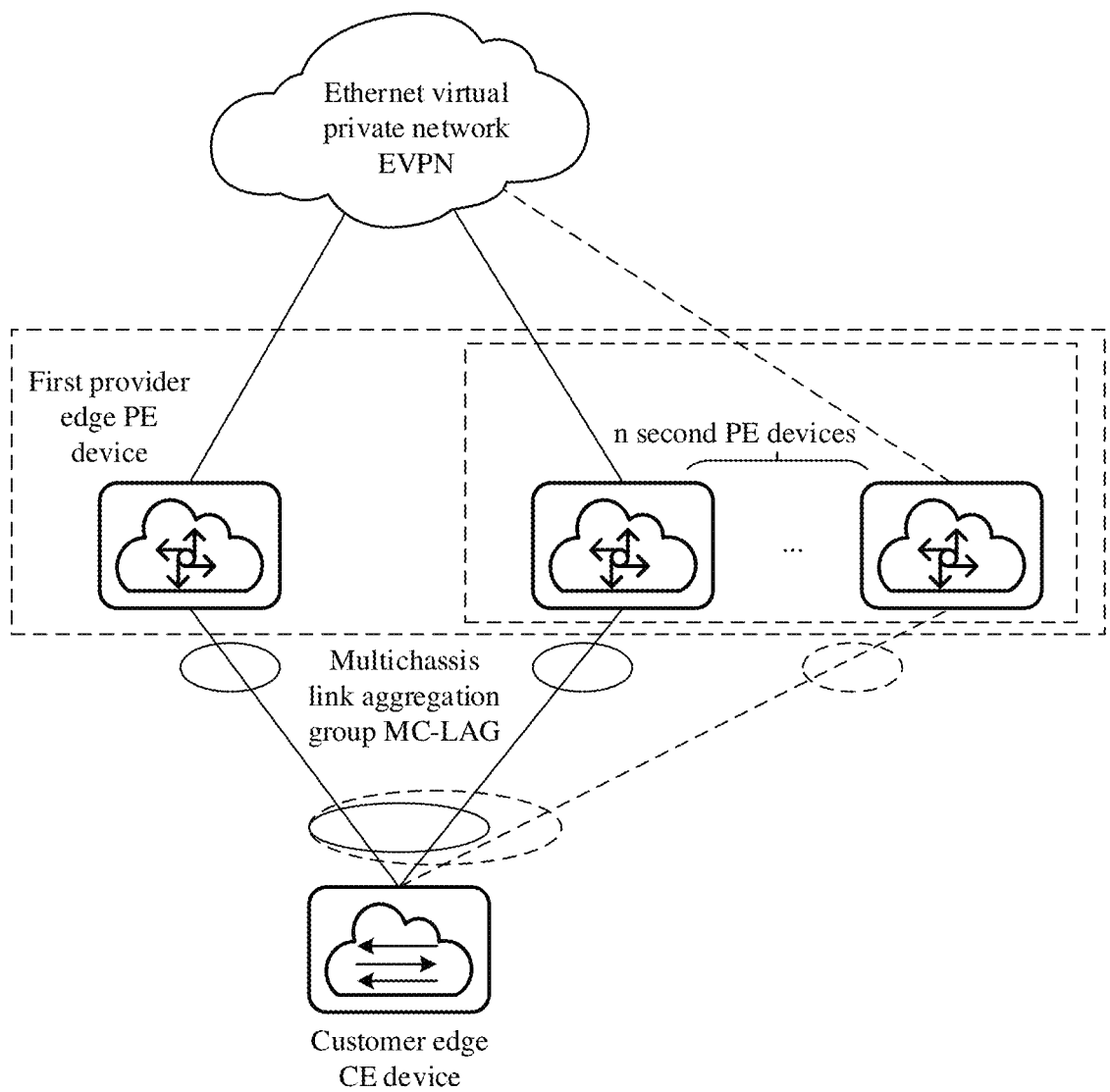
FIG. 7 is a schematic diagram of another network system according to an embodiment of this application.

FIG. 7 is a schematic diagram of another network system according to an embodiment of this application. As shown in FIG. 7, an MC-LAG is established between a first provider edge (PE) device and n second PE devices, to implement multi-homed access of a customer edge (CE) device. The first PE device and the n second PE devices are connected to an EVPN network, and are used for traffic forwarding. In this case, the first PE device and the n second PE devices form load sharing, and jointly forward traffic; or when a device serving as a primary PE is faulty, traffic may be quickly switched to another PE device, thereby ensuring normal running of a service.

Herein, n is an integer greater than or equal to 1. When n is equal to 1, the MC-LAG is established between the first PE device and the second PE device, to implement dual-homed access of the CE device. When n is greater than 1, three-homed and above access of the CE device is implemented. For example, when n is equal to 3, the MC-LAG is established between the first PE device and the three second PE devices, so that traffic is forwarded by the four PE devices jointly. A quantity of second PE devices is not limited to 1 or 3, and may be another integer greater than or equal to 1. This is not specifically limited herein.

The first PE device and the n second PE devices are connected to the EVPN network, and the PE devices may send ES routes to each other. The ES route may carry a route distinguisher (RD), an Ethernet segment identifier (ESI), and a source IP address of an EVPN instance on the local PE device, and is used to implement automatic discovery between the PE devices connected to the same CE device. In addition, the ES route may be further used for designated forwarder (DF) election, that is, designating one PE device from the first PE device and the n second PE devices to forward multicast traffic. The first PE device and the n second PE devices constitute a multi-homing redundancy group. In the multi-homing redundancy group, only one PE device is allowed to forward multicast traffic, and such a PE device is a DF.

A packet format of the ES route is shown in Table 1.

TABLE 1

Packet format of an ES route

Route distinguisher
Ethernet segment identifier
IP address length
Originating router's IP address
. . .

Each field in the ES route is explained as follows:

Route distinguisher: A route distinguisher field is constituted by a combination of a source IP address that is set on the PE device, and includes eight bytes.

Ethernet segment identifier: An Ethernet segment identifier field is a unique identifier defined by a connection between the PE device and the CE device, and includes 10 bytes.

IP address length: This field indicates a length of the source address configured on the PE device, and includes one byte.

Originating router's IP address: This field indicates the source address configured on the PE device, and includes four bytes or 16 bytes.

Figures 8, 9:
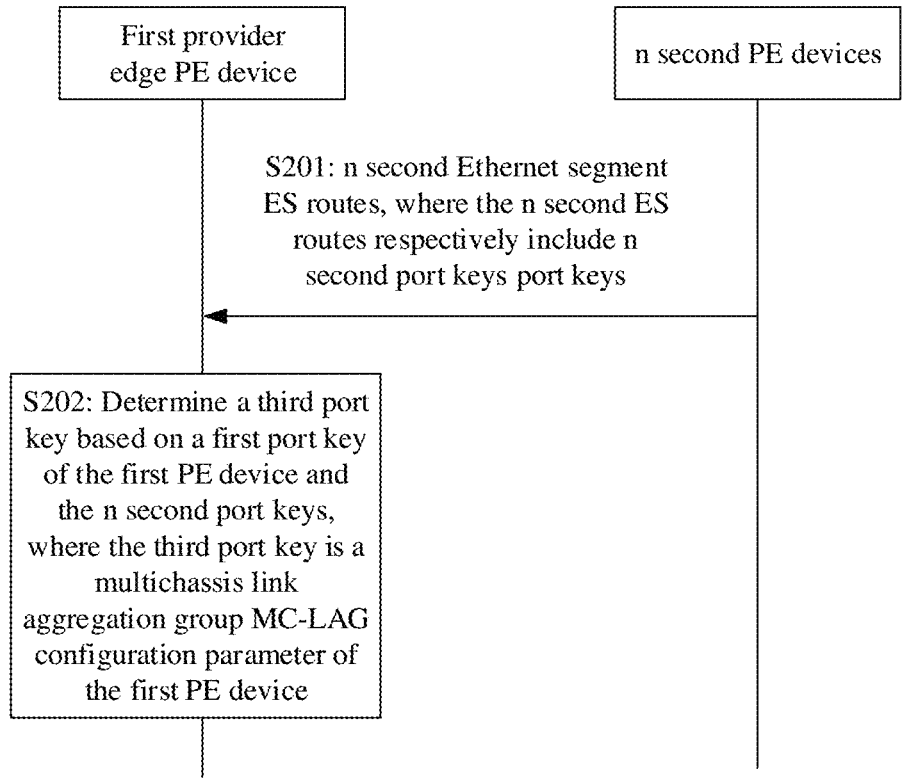
FIG. 8 is a schematic diagram of another multichassis link aggregation method according to an embodiment of this application.
FIG. 9 is a schematic diagram of an extended attribute field according to an embodiment of this application.

FIG. 8 is a schematic diagram of another multichassis link aggregation method according to an embodiment of this application. The network system shown in FIG. 7 is used as an example. As shown in FIG. 8, the multichassis link aggregation method performed on the network system includes the following steps.

S201: A first PE device receives n second ES routes of n second PE devices, where the n second ES routes respectively include n second port keys, and the n second ES routes are in one-to-one correspondence with the n second port keys.

The first PE device and the n second PE devices are connected to an EVPN network, and the first PE device and the n second PE devices send ES routes to each other. The n second ES routes received by the first PE device are respectively from the n second PE devices. Each of the n second ES routes includes one second port key.

S202: The first PE device determines a third port key based on a first port key of the first PE device and the n second port keys, where the third port key is an MC-LAG configuration parameter of the first PE device.

After receiving the n second ES routes, the first PE device determines the third port key based on the first port key and the n second port keys. The third port key is the MC-LAG configuration parameter of the first PE device. The MC-LAG configuration parameter of the first PE device is used for LACP negotiation between the first PE device and a CE device, so as to implement link aggregation.

Optionally, the first port key is stored in the first PE device, or the first port key is carried in a first ES route of the first PE device.

Optionally, the n second port keys are respectively carried in extended attribute fields of the n second ES routes. The second ES route is extended, and the extended attribute field is added to the second ES route, where the extended attribute field is used to carry the second port key of the second PE device.

A packet format of the extended second ES route may be, for example, in a form shown in Table 2.

TABLE 2

Packet format of an extended second ES route

Route distinguisher
Ethernet segment identifier
IP address length
Originating router's IP address
LACP-para community
. . .

The newly added field in the extended second ES route is explained as follows:

LACP-para community: This is the extended attribute field, and the field is used to carry the second port key of the second PE device.

FIG. 9 is a schematic diagram of an extended attribute field according to an embodiment of this application, where a local-port-key field may carry a port key locally generated by the second PE device, that is, the second port key.

Optionally, the third port key is one of the first port key and the n second port keys.

In a possible implementation, the first PE device sorts the first port key and the n second port keys, and determines that a port key in the $i^{th}$ position is the third port key, where i is a positive integer. For example, i may be 1, and the first PE device determines that a port key whose ordinal value is the smallest is the third port key. Alternatively, i may be (n+1), and the first PE device determines that a port key whose ordinal value is the largest is the third port key. Alternatively, i may be another positive integer between 1 and (n+1), and the first PE device determines that a port key with a fixed ordinal value is the third port key.

In another possible implementation, the first port key is carried in the first ES route of the first PE device, the first PE device performs DF election on the first PE device and the n second PE devices based on the first ES route and the n second ES routes, to determine a DF in the first PE device and the n second PE devices, and the first PE device determines that a port key included in an ES route corresponding to the DF is the third port key.

Optionally, the third port key is determined based on the first port key and the n second port keys, and is not one of the first port key and the n second port keys.

In a possible implementation, the first PE device sorts the first port key and the n second port keys, selects a port key in the $i^{th}$ position, where i is a positive integer, and then performs further calculation on the port key in the $i^{th}$ position according to a preset algorithm, to obtain the third port key. Likewise, i may be 1 or (n+1), or may be another positive integer between 1 and (n+1). This is not limited herein.

An MC-LAG is established between the first PE device and the n second PE devices, to implement multi-homed access of the CE device. During multichassis link aggregation, each of the first PE device and the n second PE devices separately negotiates with the CE device by using an LACP protocol. An LACP negotiation packet of the first PE device carries the third port key of the first PE device, and LACP negotiation packets of the n second PE devices respectively carry port keys of the n second PE devices. To implement multichassis link aggregation, the third port key of the first PE device is the same as the port keys of the n second PE devices. It may be understood that any one of the n second PE devices may determine a port key of the second PE device by using the foregoing method. In other words, the first PE device and the n second PE devices may determine the same port keys by using the foregoing method, thereby implementing multichassis link aggregation.

In the foregoing method, the MC-LAG is deployed between the first PE device and the n second PE devices. During multichassis link aggregation, the first PE device receives the n second ES routes of the n second PE devices, and then may determine the MC-LAG configuration parameter of the first PE device. For another PE device in the MC-LAG, an MC-LAG configuration parameter of the another PE device may be determined in a similar manner, so as to implement automatic coordination of MC-LAG configuration parameters, thereby simplifying configuration of multichassis link aggregation. The port key of the PE device is carried by using the ES route, and a port key value in the MC-LAG is negotiated accordingly. Therefore, MC-LAG configuration parameters can be conveniently and quickly negotiated by using an implementation mechanism of the EVPN network. This helps implement inter-vendor interworking of multichassis link aggregation, and improves efficiency of MC-LAG configuration parameter negotiation between devices.

Figure 10:
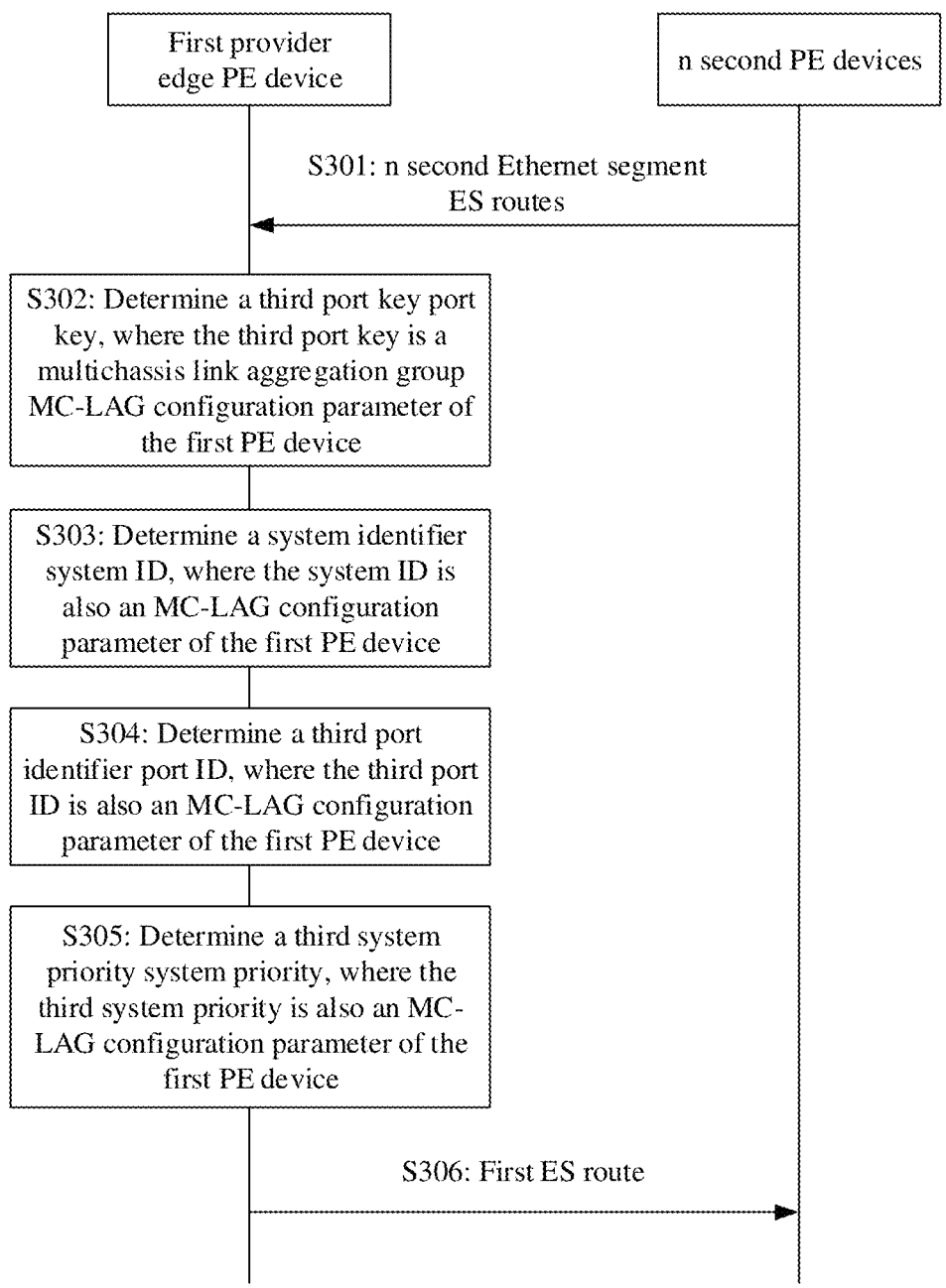
FIG. 10 is a schematic diagram of another multichassis link aggregation method according to an embodiment of this application.

FIG. 10 is a schematic diagram of another multichassis link aggregation method according to an embodiment of this application. The network system shown in FIG. 7 is used as an example. As shown in FIG. 10, the multichassis link aggregation method performed in the network system includes the following steps.

S301: A first PE device receives n second ES routes of n second PE devices.

The first PE device and the n second PE devices are connected to an EVPN network, and the first PE device and the n second PE devices send ES routes to each other. The n second ES routes received by the first PE device are respectively from the n second PE devices. The n second ES routes respectively carry n second port keys.

S302: The first PE device determines a third port key, where the third port key is an MC-LAG configuration parameter of the first PE device.

For an example implementation of determining the third port key by the first PE device, refer to S202 in FIG. 8 described above. Details are not described herein again.

S303: The first PE device determines a system ID, where the system ID is also an MC-LAG configuration parameter of the first PE device.

Optionally, the first PE device determines the system ID of the first PE device based on an obtained first Ethernet segment identifier (ESI) of the first PE device, where the first ESI is the same as n second ESIs included in the n second ES routes.

In a possible implementation, the first ESI includes 10 bytes, and the first PE device uses the first to the seventh bytes of the first ESI as the system ID of the first PE device.

To implement multichassis link aggregation, the system ID of the first PE device is the same as system IDs of the n second PE devices. It may be understood that, because the ESIs of the first PE device and the n second PE devices are the same, that is, each of the ESIs is the second ESI, any one of the n second PE devices may also determine a system ID of the second PE device based on the second ESI, and the system ID is the same as the system ID of the first PE device.

Optionally, the system ID may be alternatively carried in the ES route to implement system ID negotiation. The n second ES routes respectively further include n second system IDs, and the n second ES routes are in one-to-one correspondence with the n second system IDs. The first PE device determines a third system ID based on a first system ID of the first PE device and the n second system IDs. The third system ID is a negotiated system ID of the first PE device, that is, an MC-LAG configuration parameter of the first PE device.

The first system ID is stored in the first PE device, or the first system ID is carried in a first ES route of the first PE device.

In a possible implementation, the first PE device sorts the first system ID and the n second system IDs, and determines that a system ID in the $j^{th}$ position is the third system ID, where j is a positive integer. For example, j may be 1, and the first PE device determines that a system ID whose ordinal value is the smallest is the third system ID. Alternatively, j may be (n+1), and the first PE device determines that a system ID whose ordinal value is the largest is the third system ID. Alternatively, j may be another positive integer between 1 and (n+1), and the first PE device determines that a system ID with a fixed ordinal value is the third system ID.

It may be understood that any one of the n second PE devices may also determine a system ID of the second PE device by using the foregoing method, and the system ID is the same as the third system ID.

S304: The first PE device determines a third port identifier ID, where the third port ID is also an MC-LAG configuration parameter of the first PE device.

Optionally, the n second ES routes respectively further include n second port IDs, and the n second ES routes are in one-to-one correspondence with the n second port IDs. The first PE device sorts a first port ID of the first PE device and the n second port IDs, to determine an ordinal value corresponding to the first port ID, where the first port ID is an original port ID of the first PE device before sorting. The first PE device re-determines the third port ID of the first PE device based on the ordinal value corresponding to the first port ID.

In a possible implementation, the first PE device sorts the first port ID and the n second port IDs in ascending order, and determines that the ordinal value corresponding to the first port ID is the third port ID of the first PE device. For example, n is 3, and the first PE device sorts the first port ID and the three second port IDs in ascending order, and determines that the first port ID is in the second position. In this case, the first PE device determines that the third port ID is 2.

In another possible implementation, the first PE device sorts the first port ID and the n second port IDs in descending order, and determines that the ordinal value corresponding to the first port ID is the third port ID of the first PE device. For example, n is 3, and the first PE device sorts the first port ID and the three second port IDs in descending order, and determines that the first port ID is in the third position. In this case, the first PE device determines that the third port ID is 3.

In another possible implementation, the first PE device sorts the first port ID and the n second port IDs in ascending order, first determines the ordinal value corresponding to the first port ID, and then determines that a product of the ordinal value corresponding to the first port ID and a preset coefficient is the third port ID of the first PE device. For example, n is 3, and the preset coefficient is 2. The first PE device sorts the first port ID and the three second port IDs in ascending order, first determines that the first port ID is in the second position, and then determines that the product of the ordinal value corresponding to the first port ID and the preset coefficient is 4. In this case, the first PE device determines that the third port ID is 4.

In another possible implementation, the first PE device sorts the first port ID and the n second port IDs in descending order, first determines the ordinal value corresponding to the first port ID, and then determines that a product of the ordinal value corresponding to the first port ID and a preset coefficient is the third port ID of the first PE device. For example, n is 3, and the preset coefficient is 2. The first PE device sorts the first port ID and the three second port IDs in descending order, first determines that the first port ID is in the third position, and then determines that the product of the ordinal value corresponding to the first port ID and the preset coefficient is 6. In this case, the first PE device determines that the third port ID is 6.

During multichassis link aggregation, the first ES route of the first PE device may carry the third port ID of the first PE device, and the n second ES routes of the n second PE devices may respectively carry port IDs of the n second PE devices. To implement multichassis link aggregation, the third port ID of the first PE device cannot conflict with the port IDs of the n second PE devices. It may be understood that any one of the n second PE devices may determine a port ID of the second PE device by using the foregoing method, and the port ID does not conflict with the third port ID.

S305: The first PE device determines a third system priority system priority, where the third system priority is also an MC-LAG configuration parameter of the first PE device.

The n second ES routes respectively further include n second system priorities, and the n second ES routes are in one-to-one correspondence with the n second system priorities. The first PE device determines the third system priority based on a first system priority of the first PE device and the n second system priorities.

Optionally, the first system priority is stored in the first PE device, or the first system priority is carried in the first ES route of the first PE device.

Optionally, the n second system priorities are respectively carried in extended attribute fields of the n second ES routes.

In a possible implementation, the first PE device sorts the first system priority and the n second system priorities, and determines that a system priority in the $k^{th}$ position is the third system priority, where k is a positive integer. For example, k may be 1, and the first PE device determines that a system priority whose ordinal value is the smallest is the third system priority. Alternatively, k may be (n+1), and the first PE device determines that a system priority whose ordinal value is the largest is the third system priority. Alternatively, k may be another positive integer between 1 and (n+1), and the first PE device determines that a system priority with a fixed ordinal value is the third system priority.

To implement multichassis link aggregation, the third system priority of the first PE device is the same as system priorities of the n second PE devices. It may be understood that any one of the n second PE devices may determine a system priority of the second PE device by using the foregoing method, and the system priority is the same as the third system priority.

It should be noted that, alternatively, parameters such as the port key, the system ID, the port ID, and the system priority may not be carried in the ES route sent by the PE device, but be carried in another type of packet, to be sent to another PE device that constitutes an MC-LAG group with the PE device.

In a possible implementation, the n second ES routes further respectively include n fourth port keys, the n second ES routes are in one-to-one correspondence with the n fourth port keys, and then fourth port keys are port keys of CE devices respectively connected to then second PE devices. The first PE device determines whether there is an inconsistency in a fifth port key and the n fourth port keys, where the fifth port key is a port key of a CE device connected to the first PE device. When there is an inconsistency, the first PE device generates alarm information.

In a process of performing LACP negotiation with the CE device, the PE device may obtain the port key of the CE device, and then add the obtained port key of the CE device to the ES route advertised by the PE device. In other words, the first PE device may obtain the fifth port key of the connected CE device, and the second PE device may obtain the fourth port key of the connected CE device, and add the fourth port key to the second ES route of the second PE device. After receiving the n second ES routes, the first PE device may determine whether there is an inconsistency in the fifth port key and the n fourth port keys. If there is an inconsistency, it indicates that different CE devices access a same Ethernet segment (ES), and the first PE device generates the alarm information to inform a user of a configuration error. It should be noted that, when one CE device accesses an EVPN network in a multi-homed manner by using a plurality of Ethernet links, the plurality of Ethernet links may form one ES.

Optionally, the n fourth port keys are respectively carried in extended attribute fields of the n second ES routes. The second ES route is extended, and the extended attribute field is added to the second ES route, where the extended attribute field is used to carry the second port key of the second PE device, and is further used to carry the fourth port key of the CE device connected to the second PE device.

FIG. 11 is a schematic diagram of another extended attribute field according to an embodiment of this application, where a local-port-key field carries a port key locally generated by the second PE device, that is, the second port key; and a ce-port-key field carries a port key generated by the CE device connected to the second PE device, that is, the fourth port key.

Optionally, the extended attribute field in the second ES route may be further used to carry the second system priority of the second PE device, and the n second system priorities are respectively carried in the extended attribute fields of the n second ES routes.

FIG. 12 is a schematic diagram of another extended attribute field according to an embodiment of this application, where a local-port-key field carries a port key locally generated by the second PE device, that is, the second port key; a ce-port-key field carries a port key generated by the CE device connected to the second PE device, that is, the fourth port key; and an lacp-sys-priority field carries the second system priority of the second PE device.

It should be noted that, alternatively, the port key of the CE device connected to the PE device may not be carried in the ES route sent by the PE device, but be carried in another type of packet, to be sent to another PE device that constitutes the MC-LAG group with the PE device.

S306: The first PE device sends the first ES route to the n second PE devices.

The first ES route includes a first port key of the first PE device.

In the foregoing method, the MC-LAG is deployed between the first PE device and the n second PE devices. During multichassis link aggregation, the first PE device receives the n second ES routes of the n second PE devices, and then may determine the MC-LAG configuration parameter of the first PE device. For another PE device in the MC-LAG, the another PE device may determine an MC-LAG configuration parameter of the another PE device in a similar manner, so as to implement automatic coordination of MC-LAG configuration parameters, thereby simplifying configuration of multichassis link aggregation. An implementation mechanism of the EVPN network is used, and this also helps implement inter-vendor interworking of multichassis link aggregation. Besides, according to this method, an incorrect configuration can also be detected, and indicated to the user by using an alarm.

FIG. 13 is a schematic diagram of a first network device according to an embodiment of this application. The first network device 400 is included in an MC-LAG. The MC-LAG further includes n second network devices, where n is an integer greater than or equal to 1. As shown in FIG. 13, the first network device 400 includes a transceiver module 401 and a processing module 402.

The transceiver module 401 is configured to receive n pieces of second information of the n second network devices, where the n pieces of second information respectively include n second port keys, and the n pieces of second information are in one-to-one correspondence with the n second port keys.

The processing module 402 is configured to determine a third port key based on a first port key of the first network device 400 and the n second port keys, where the third port key is an MC-LAG configuration parameter of the first network device 400.

In this embodiment of this application, the MC-LAG is deployed between the first network device and the n second network devices. During multichassis link aggregation, the first network device receives the n pieces of second information of the n second network devices, and then may determine the MC-LAG configuration parameter of the first network device. For another network device in the MC-LAG, an MC-LAG configuration parameter of the another network device may be determined in a similar manner, so as to implement automatic coordination of MC-LAG configuration parameters, thereby simplifying configuration of multichassis link aggregation.

In a possible implementation, the third port key is one of the first port key and the n second port keys.

In a possible implementation, the processing module 402 is configured to: sort the first port key and the n second port keys, and determine that a port key in the $i^{th}$ position is the third port key, where i is a positive integer.

In a possible implementation, the n pieces of second information are n second Ethernet segment ES routes, and the n second port keys are respectively carried in extended attribute fields of the n second ES routes.

In a possible implementation, the first port key is carried in a first ES route, and the processing module 402 is configured to: perform designated forwarder DF election on the first network device and the n second network devices based on the first ES route and the n second ES routes, to determine a DF in the first network device and the n second network devices; and determine that a port key included in an ES route corresponding to the DF is the third port key.

In a possible implementation, the MC-LAG configuration parameter further includes a system ID, and the processing module 402 is further configured to: determine the system ID of the first network device based on an obtained first Ethernet segment identifier ESI of the first network device, where the first ESI is the same as n second ESIs included in the n second ES routes.

In a possible implementation, the MC-LAG configuration parameter further includes a third system ID, the n second ES routes respectively include n second system IDs, the n second ES routes are in one-to-one correspondence with the n second system IDs, and the processing module 402 is further configured to: sort a first system ID of the first network device and the n second system IDs, and determine that a system ID in the $j^{th}$ position is the third system ID of the first network device, where j is a positive integer.

In a possible implementation, the MC-LAG configuration parameter further includes a third port identifier ID, the n second ES routes respectively include n second port IDs, the n second ES routes are in one-to-one correspondence with the n second port IDs, and the processing module 402 is further configured to: sort a first port ID of the first network device and the n second port IDs, to determine an ordinal value corresponding to the first port ID, where the first port ID is an original port ID of the first network device before sorting; and re-determine the third port ID of the first network device based on the ordinal value.

In a possible implementation, the MC-LAG configuration parameter further includes a third system priority system priority, the n second ES routes respectively include n second system priorities, the n second ES routes are in one-to-one correspondence with the n second system priorities, and the processing module 402 is further configured to: sort a first system priority of the first network device and the n second system priorities, and determine that a system ID in the $k^{th}$ position is the third system priority of the first network device, where k is a positive integer.

In a possible implementation, the first network device is a first provider edge PE device, the n second network devices are n second PE devices, the n second PE devices are respectively connected to customer edge CE devices, the n pieces of second information further respectively include n fourth port keys, the n pieces of second information are in one-to-one correspondence with the n fourth port keys, the n fourth port keys are port keys of the CE devices respectively connected to the n second PE devices, and the processing module 402 is further configured to: determine whether there is an inconsistency in a fifth port key and the n fourth port keys, where the fifth port key is a port key of a CE device connected to the first PE device; and generate alarm information when there is an inconsistency.

In a possible implementation, the n pieces of second information are n ES routes, and the n fourth port keys are respectively carried in extended attribute fields of the n ES routes.

In a possible implementation, the transceiver module 401 is further configured to: send first information to the n second network devices, where the first information includes the first port key.

It may be understood that the first network device shown in FIG. 13 may correspond to the first network device in the multichassis link aggregation method in the embodiments of this application, and may implement a corresponding procedure of the multichassis link aggregation method in the embodiments of this application. For brevity, details are not described herein again.

Figure 14:
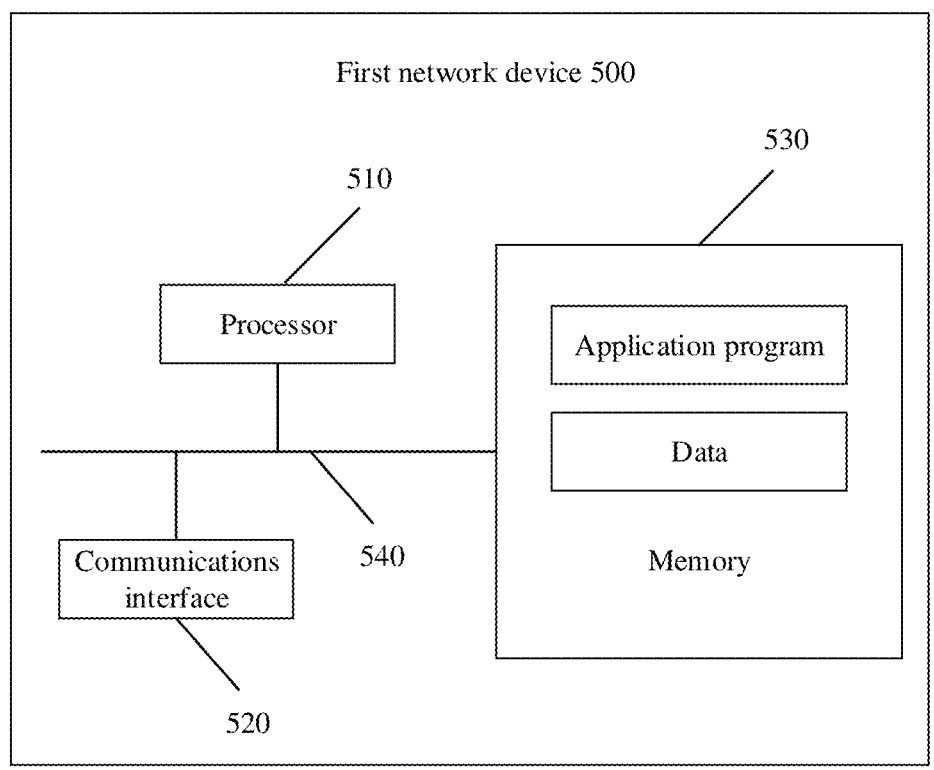
FIG. 14 is a schematic diagram of another first network device according to an embodiment of this application.

FIG. 14 is a schematic diagram of another first network device 500 according to an embodiment of this application. As shown in FIG. 14, the first network device 500 includes a processor 510, a communications interface 520, and a memory 530. The processor 510, the communications interface 520, and the memory 530 are connected to each other by using an internal bus 540.

The processor 510 may include one or more general-purpose processors, such as a central processing unit (CPU) or a combination of a CPU and a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The bus 540 may be a peripheral component interconnect (PCI) bus, an extended industry standard architecture (EISA) bus, or the like. The bus 540 may be classified into an address bus, a data bus, a control bus, and the like. For ease of representation, only one line is used to represent the bus in FIG. 14, but this does not mean that there is only one bus or only one type of bus.

The memory 530 may include a volatile memory, for example, a random access memory (RAM). Alternatively, the memory 530 may include a non-volatile memory, for example, a read-only memory (ROM), a flash memory, a hard disk drive (HDD), or a solid-state drive (SSD). Alternatively, the memory 530 may include a combination of the foregoing types of memories. The memory 530 may be configured to store a program and data, so that the processor 510 invokes program code and the data that are stored in the memory 530, to implement a function of the foregoing processing module 402.

It may be understood that the network device shown in FIG. 14 may correspond to the first network device in the multichassis link aggregation method in the embodiments of this application, and may implement a corresponding procedure of the multichassis link aggregation method in the embodiments of this application. For brevity, details are not described herein again.

An embodiment of this application further provides a readable storage medium. The readable storage medium stores instructions. When the instructions are run on a first network device, the first network device is enabled to perform a procedure related to the first network device in the foregoing method embodiments.

An embodiment of this application further provides a computer program product. When the computer program product is run on a first network device, the first network device is enabled to perform a procedure related to the first network device in the foregoing method embodiments.

In the foregoing embodiments, descriptions in embodiments have respective focuses. For a part that is not described in detail in an embodiment, refer to related descriptions in other embodiments.

It should be understood that "first", "second", "third", "fourth", and various numbers in this specification are merely used for differentiation for ease of description, and are not construed as any limitation on the scope of this application.

It should be further understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

A person of ordinary skill in the art may be aware that, units and algorithm steps in the examples described with reference to embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

In the several embodiments provided in this application, it should be understood that the disclosed device and method may be implemented in other manners. For example, the device embodiments described above are merely examples. For example, division into the modules is merely a type of logical function division, and another division manner may be used during actual implementation.

In conclusion, the foregoing embodiments are merely intended for describing the technical solutions of this application, but are not for limiting this application. Although this application is described in detail with reference to the foregoing embodiments, a person of ordinary skill in the art should understand that modifications to the technical solutions recorded in the foregoing embodiments or equivalent replacements to some technical features thereof may still be made, without departing from the scope of the technical solutions of embodiments of this application.

What is claimed is:

1. A multichassis link aggregation method, comprising:
receiving, by a first network device, n pieces of second information of n second network devices, wherein the first network device and the n second network devices are in a multichassis link aggregation group (MC-LAG), n is an integer greater than or equal to 1, then pieces of second information comprise n second port keys, the n pieces of second information are in one-to-one correspondence with the n second port keys, the n pieces of second information are n second Ethernet segment (ES) routes, and the n second port keys are carried in extended attribute fields of the n second ES routes;
determining, by the first network device, a first system identifier (ID) of the first network device based on an obtained first Ethernet segment identifier (ESI) of the first network device, wherein the first ESI is identical to n second ESIs in the n second ES routes; and
determining, by the first network device, a third port key based on a first port key of the first network device and the n second port keys, wherein the third port key is an MC-LAG configuration parameter of the first network device, and the MC-LAG configuration parameter comprises the first system ID of the first network device.

2. The multichassis link aggregation method according to claim 1, wherein the third port key is one of the first port key or the n second port keys.

3. The multichassis link aggregation method according to claim 2, wherein the determining of the third port key based on the first port key and the n second port keys comprises:
sorting, by the first network device, the first port key and the n second port keys; and
determining that a port key in an $i^{th}$ position among the first port key and the n second port keys having been sorted is the third port key, wherein i is a positive integer.

4. The multichassis link aggregation method according to claim 1, wherein the first port key is carried in a first ES route, and the determining of the third port key based on the first port key and the n second port keys comprises:
performing, by the first network device, designated forwarder (DF) election on the first network device and the n second network devices based on the first ES route and the n second ES routes to determine a DF in the first network device and the n second network devices; and
determining, by the first network device, that a port key in an ES route corresponding to the DF is the third port key.

5. The multichassis link aggregation method according to claim 1, wherein the MC-LAG configuration parameter further comprises a third system identifier (ID), the ID of the first network device, the n second ES routes comprise n second system IDs, the n second ES routes are in one-to-one correspondence with the n second system IDs, and the method further comprises:
sorting, by the first network device, the first system ID of the first network device and the n second system IDs; and
determining that a system ID in a $j^{th}$ position among the first system ID and the n second system IDs having been sorted is the third system ID of the first network device, wherein j is a positive integer.

6. The multichassis link aggregation method according to claim 1, wherein the MC-LAG configuration parameter further comprises a third port identifier ID of the first network device, the n second ES routes comprise n second port IDs, the n second ES routes are in one-to-one correspondence with the n second port IDs, and the method further comprises:
sorting, by the first network device, a first port ID of the first network device and the n second port IDs, to determine an ordinal value corresponding to the first port ID of the first network device, wherein the first port ID-ID of the first network device is an original port ID of the first network device before sorting; and
re-determining the third port ID of the first network device based on the ordinal value.

7. The multichassis link aggregation method according to claim 1, wherein the MC-LAG configuration parameter further comprises a third system priority, the n second ES routes comprise n second system priorities, the n second ES routes are in one-to-one correspondence with the n second system priorities, and the method further comprises:
sorting, by the first network device, a first system priority of the first network device and the n second system priorities; and
determining that a system priority in a $k^{th}$ position among the first system priority and the n second system priorities having been sorted is the third system priority of the first network device, wherein k is a positive integer.

8. The multichassis link aggregation method according to claim 1, wherein the first network device is a first provider edge (PE) device, the n second network devices are n second PE devices, the n second PE devices are connected to customer edge (CE) devices, the n pieces of second information further comprise n fourth port keys, the n pieces of second information are in one-to-one correspondence with the n fourth port keys, the n fourth port keys are port keys of the CE devices connected to the n second PE devices, and the method further comprises:
  determining, by the first PE device, whether there is an inconsistency in a fifth port key and the n fourth port keys, wherein the fifth port key is a port key of a CE device connected to the first PE device; and
  generating, by the first PE device, alarm information in response to determining there is an inconsistency in the fifth port key.

9. The multichassis link aggregation method according to claim 8, wherein the n fourth port keys are carried in the extended attribute fields of the n second ES routes.

10. The multichassis link aggregation method according to claim 1, wherein the method further comprises:
  sending, by the first network device, first information to the n second network devices, wherein the first information comprises the first port key.

11. A first network device, comprising:
  a processor; and
  a memory having instructions stored thereon that, when executed by the processor, cause the first network device to:
  receive n pieces of second information of n second network devices, wherein the n second network devices and the first network device are in a multichassis link aggregation group (MC-LAG), n is an integer greater than or equal to 1, then pieces of second information comprise n second port keys, and the n pieces of second information are in one-to-one correspondence with the n second port keys, the n pieces of second information are n second Ethernet segment (ES) routes, and the n second port keys are carried in extended attribute fields of the n second ES routes;
  determine a first system identifier (ID) of the first network device based on an obtained first Ethernet segment identifier (ESI) of the first network device, wherein the first ESI is identical to n second ESIs in the n second ES routes; and
  determine a third port key based on a first port key of the first network device and the n second port keys, wherein the third port key is an MC-LAG configuration parameter of the first network device, and the MC-LAG configuration parameter comprises the first system ID of the first network device.

12. The first network device according to claim 11, wherein the third port key is one of the first port key or the n second port keys.

13. The first network device according to claim 12, wherein the first network device is further caused to:
  sort the first port key and the n second port keys; and
  determine that a port key in an $i^{th}$ position among the first port key and the n second port keys having been sorted is the third port key, wherein i is a positive integer.

14. The first network device according to claim 11, wherein the first port key is carried in a first ES route, and the first network device is further caused to:
  perform designated forwarder (DF) election on the first network device and the n second network devices based on the first ES route and the n second ES routes, to determine a DF in the first network device and the n second network devices; and
  determine that a port key in an ES route corresponding to the DF is the third port key.

15. The first network device according to claim 11, wherein the MC-LAG configuration parameter further comprises a third system ID of the first network device, the n second ES routes comprise n second system IDs, the n second ES routes are in one-to-one correspondence with the n second system IDs, and the first network device is further caused to:
  sort the first system ID of the first network device and the n second system IDs and determine that a system ID in a $j^{th}$ position among the first system ID and the n second system IDs having been sorted is the third system ID of the first network device, wherein j is a positive integer.

16. A non-transitory computer readable storage medium having instructions stored thereon that, when executed by a processor, cause a first network device to:
  receive n pieces of second information of n second network devices, wherein the n second network devices and the first network device are in a multichassis link aggregation group (MC-LAG), n is an integer greater than or equal to 1, the n pieces of second information comprise n second port keys, and the n pieces of second information are in one-to-one correspondence with the n second port keys, the n pieces of second information are n second Ethernet segment (ES) routes, and the n second port keys are carried in extended attribute fields of the n second ES routes;
  determine a first system identifier (ID) of the first network device based on an obtained first Ethernet segment identifier (ESI) of the first network device, wherein the first ESI is identical to n second ESIs in the n second ES routes; and
  determine a third port key based on a first port key of the first network device and the n second port keys, wherein the third port key is an MC-LAG configuration parameter of the first network device, and the MC-LAG configuration parameter comprises the first system ID of the first network device.

17. The non-transitory computer readable storage medium according to claim 16, wherein the third port key is one of the first port key or the n second port keys.

18. The non-transitory computer readable storage medium according to claim 17, wherein the first network device is further caused to:
  sort the first port key and the n second port keys; and
  determine that a port key in an $i^{th}$ position among the first port key and the n second port keys having been sorted is the third port key, wherein i is a positive integer.

19. The non-transitory computer readable storage medium claim 16, wherein the first port key is carried in a first ES route, and the first network device is further caused to:
  perform designated forwarder (DF) election on the first network device and the n second network devices based on the first ES route and the n second ES routes, to determine a DF in the first network device and the n second network devices; and
  determine that a port key in an ES route corresponding to the DF is the third port key.

20. The non-transitory computer readable storage medium according to claim 16, wherein the MC-LAG configuration parameter further comprises a third system ID of the first network device, the n second ES routes comprise n second system IDs, the n second ES routes are in one-to-one correspondence with the n second system IDs, and the first network device is further caused to:
  sort the first system ID of the first network device and the n second system IDs and
  determine that a system ID in a $j^{th}$ position among the first system ID and the n second system IDs having been sorted is the third system ID of the first network device, wherein j is a positive integer.

* * * * *